Figure 1:
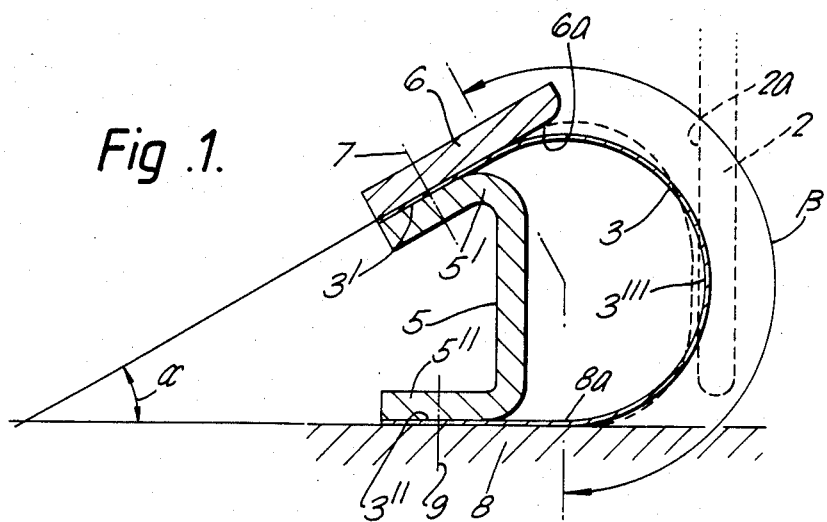

United States Patent [19]

Hahn et al.

[11] Patent Number: 4,660,805
[45] Date of Patent: Apr. 28, 1987

[54] DEVICE FOR SHUTTING OFF A PIPE

[75] Inventors: Franz D. Hahn, Beckum; Otto Heinemann, Ennigerloh; Heinz-Herbert Schmits, Rheda-Wiedenbrück, all of Fed. Rep. of Germany

[73] Assignee: Krupp Polysius AG, Beckum, Fed. Rep. of Germany

[21] Appl. No.: 756,444

[22] Filed: Jul. 18, 1985

[30] Foreign Application Priority Data

Sep. 11, 1984 [DE] Fed. Rep. of Germany ....... 3433346

[51] Int. Cl.⁴ .............................. F16K 3/30
[52] U.S. Cl. .................... 251/328; 251/326; 251/362; 251/365; 277/236
[58] Field of Search ............... 251/326, 327, 328, 329, 251/365, 364, 363, 174, 176; 277/DIG. 4, DIG. 7, 236, 362; 220/222, 224, 216

[56] References Cited

U.S. PATENT DOCUMENTS

| 4,474,205 | 10/1984 | Dreyer et al. | 251/328 X |
| 4,491,144 | 1/1985 | Dreyer et al. | 251/328 X |
| 4,527,773 | 7/1985 | Müller et al. | 251/362 X |

Primary Examiner—Martin P. Schwadron
Assistant Examiner—John S. Starsiak, Jr.
Attorney, Agent, or Firm—Learman & McCulloch

[57] ABSTRACT

The invention relates to a device for shutting off a pipe using generally U-shaped spring steel strips as sealing elements, each such element comprising a pair of arms which converge toward one another form an arcuate web at an acute angle. The deformation of the two flat arms of these sealing elements is limited by two flat, rigid rolling surfaces which are tangential to the web. Such a construction is distinguished by satisfactory functioning and a long working life.

8 Claims, 5 Drawing Figures

DEVICE FOR SHUTTING OFF A PIPE

The invention relates to a device for shutting off a pipe, particularly a pipe used for conveying hot dust-laden gases.

BACKGROUND OF THE INVENTION

Sealing elements consisting of a loop of flexible steel are already known (German Offenlegungsschrift No. 16 00 964 and U.S. Pat. No. 3,460,457) for sealing polygonal gate-type shut-off valves for large pipes which are used for conveying hot dust-laden gases. These sealing elements are gripped at both ends of the loop-shaped cross-section and engage with the main part of the loop body between the two parts to be sealed, between which the loop-shaped sealing element is pressed flat.

These known constructions have various disadvantages. Because of the loop-shaped construction and the engagement of the sealing element between the two elements which are to be sealed against each other (against which the sealing element rests at two points in all), the individual sealing elements require a large amount of material and a considerable amount of space for their installation.

The prior art also includes a shut-off device (German Offenlegungsschrift No. 25 02 240) in which the sealing element is formed by a strip of spring steel with a U-shaped cross-section gripped at the free ends of the two arms of the U on one of the two elements which are to be sealed against each other (gate valve housing or gate) and in its central region between the two gripping positions is in sealing contact with the other of the two elements. The gripped ends of the spring steel strip are in this case parallel to one another.

On loading of such a sealing element it is possible—because of the limited deformability in the direction of the gripped ends—for bending at a sharp angle to occur. In addition, since the type of deformation cannot be determined in advance no specific contact pressures can be achieved. Finally, deformation of the known sealing element can lead to sharply increasing contact pressures and thus to uncontrollable wear.

The object of the invention, therefore, is to avoid the defects of the known constructions and to provide a shut-off device which ensures even in dust-conveying pipes under high thermal load satisfactory functioning and a long operational life of the sealing elements.

SUMMARY OF THE INVENTION

A sealing element according to the invention comprises a generally U-shaped, spring steel strip having a pair of arms joined at corresponding ends to an arcuate web and converging therefrom along lines forming an acute angle. The spring steel strip is prestressed in more than a semi-circle (i.e., greater than 180° and less than 270°). As a result the spring steel strip is particularly readily deformable and facilitates long courses in the case of a level spring characteristic.

The deformation of the spring steel strip occurs gently and evenly under load (for instance when the gate is lowered). Because of the lvel spring characteristic the frictional forces do not increase as sharply as in the known constructions, and this results in a lessening of the wear and a reduction of the necessary drive forces.

According to the invention the deformability of the regions of the two arms of each spring steel strip which adjoin the gripped ends is limited outboard of such arms by two rigid rolling surfaces which are arranged tangentially with respect to the arms. As a result, when the spring steel strip is deformed it can flex smoothly and the danger of bending of the spring steel strip at a sharp angle (particularly in the zone adjoining the gripped ends) is avoided.

The device according to the invention is distinguished by a high degree of operating reliability and a long service life. Because the spring characteristic is more level the accuracy of alignment is markedly superior to that of the known constructions.

THE DRAWINGS

Figure 2:
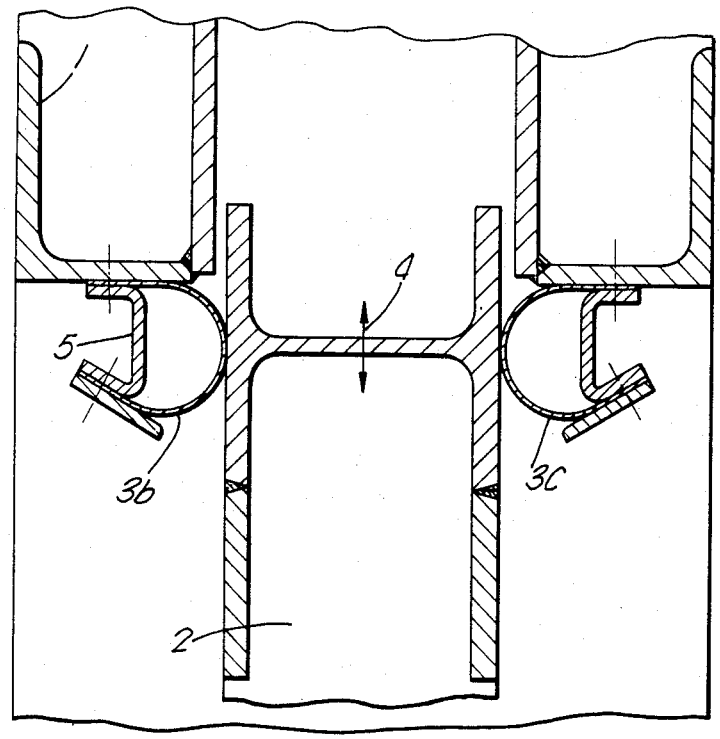
Figure 1A:
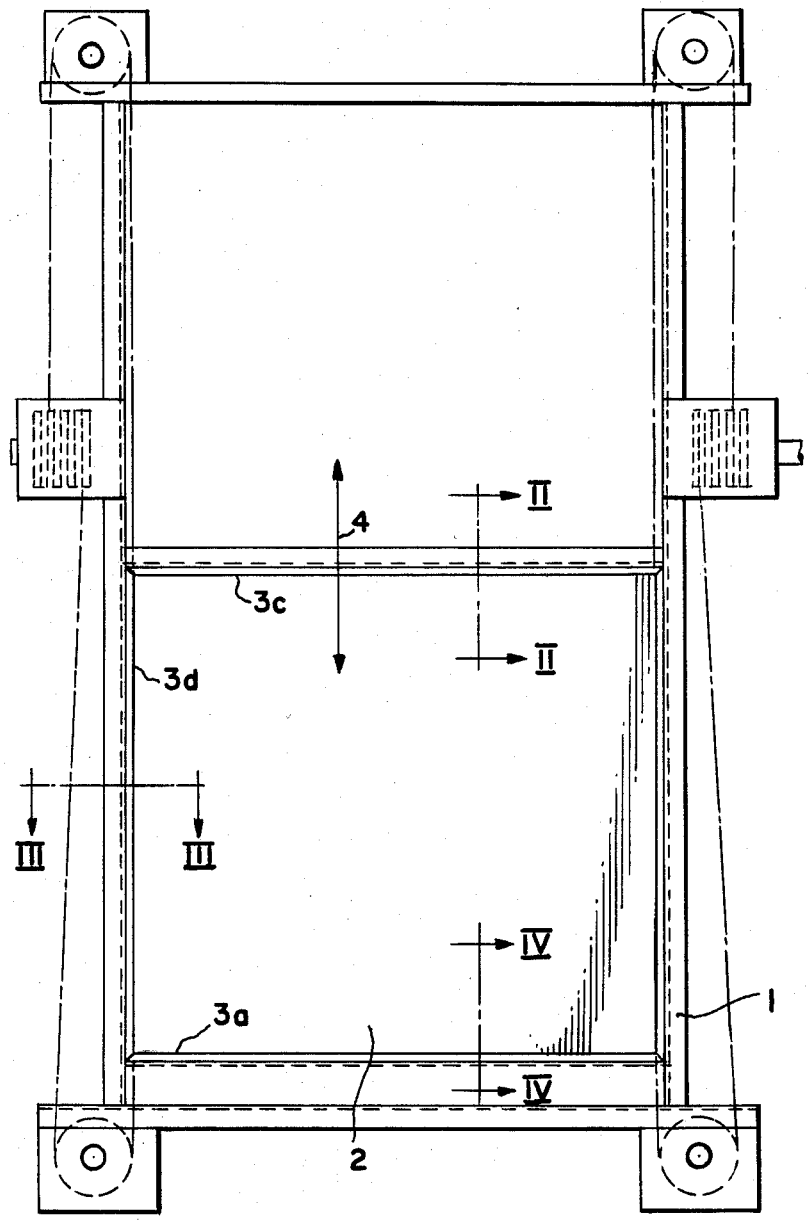
Figure 3:
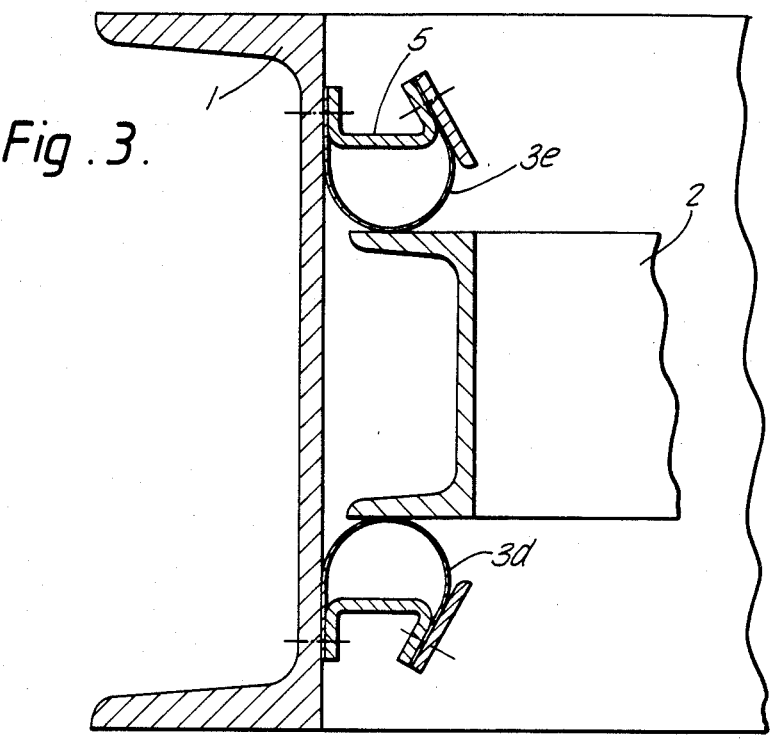
Figure 4:
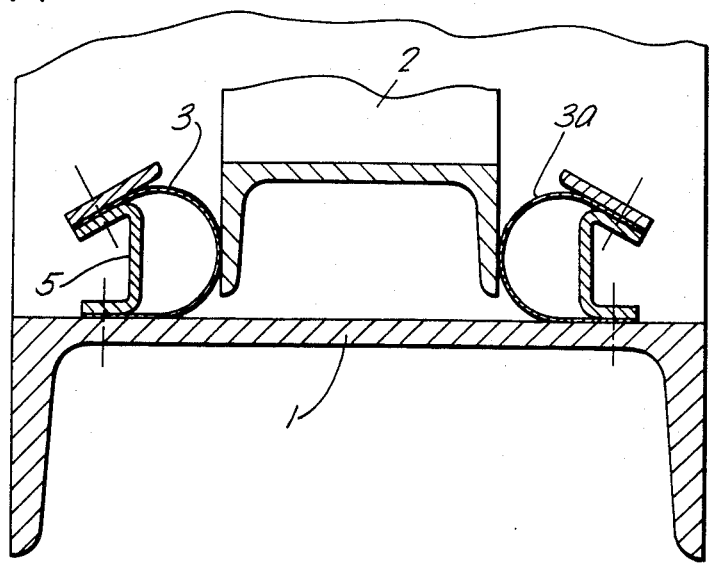

Advantageous embodiments of the invention are the subject matter of the subordinate claims and are explained in greater detail in connection with the description of an embodiment which is illustrated in the accompanying drawings wherein:

FIG. 1A is an elevational view of a conventional gate valve structure incorporating sealing elements constructed according to the invention, FIG. 1 is a schematic representation of a sealing element according to the invention, FIGS. 2, 3 and 4 are sections taken on the lines II—II, III—III, and IV—IV, respectively, of FIG. 1A.

DETAILED DESCRTIPTION

In order to shut off a pipe (which is not shown in the drawings) intended particularly for conveying hot dust-laden gases, a polygonal gate valve housing 1 (FIG. 1A) is built into the pipe and a gate 2 is capable of moving inside this gate valve housing 1 between an open position and a shut-off position.

Various sealing elements 3 to 3e are provided between the gate valve housing 1 and the gate 2, and the way in which these sealing elements are constructed, are retained and function is explained in detail with the aid of FIG. 1.

FIG. 2 shows the situation in the region of the upper seal between the gate 2 and the gate valve housing 1 provided by the sealing elements 3b and 3c (the gate 2 in this case is vertically movable in the direction of the two headed arrow 4).

FIG. 3 shows the lateral sealing by the sealing elements 3d and 3e of the gate 2 which is vertically movable (perpendicular to the drawing plane of FIG. 3).

FIG. 4 shows the situation in the region of the lower seal. Here the sealing elements 3 and 3a seal the gate 2 against the gate valve housing 1.

The way in which the sealing element 3 according to the invention is constructed, retained and functions is explained with the aid of FIG. 1 (which corresponds to the illustration of the left-hand seal in FIG. 4); (as regards construction, gripping and functioning, all the other sealing elements 3a to 3e correspond to the sealing element 3).

The sealing element 3 consists of a spring steel strip which is bent in an approximately U-shaped cross-section to form arms 3' and 3" joined at corresponding ends to an arcuate web 3'''. The arms terminate short of intersection with each other. Between the arms in a wedge shaped stay or retainer 5 having legs 5' and 5". The arm 3' is gripped between the leg 5' of the retainer and an outboard clamping element 6 by means of a screw coupling 7 which is only indicated, whilst the other arm 3" of the sealing element 3 is gripped between the leg 5" of the retainer 5 and an outboard clamping element 8

(which is formed by the gate valve housing 1) by means of a screw coupling 9.

The two legs 5', 5" of the retainer 5 are bent in such a way that the arms 3' and 3" of the sealing element converge toward their free ends at an acute angle α which lies between 5 and 90° and preferably between 15° and 45°. In the illustrated embodiment the angle is approximately 30°. This results in the sealing element 3 assuming an arc β of between 185° and 270° (approximately 210° in the illustrated embodiment).

The outboard clamping elements 6 and 8 extend beyond the legs 5', 5" of the retainer 5 i the direction of the web 3''' of the sealing element 3 and form rolling surfaces 6a, 8a which are tangential to the gripped arms 3', 3" of the sealing element.

The web 3''' of the sealing element 3 is engageable with the element to be sealed (i.e. in this case the surface 2a of the gate 2) approximately in the center of the arc β and is deformed in the manner indicated by the broken line in FIG. 1. If the web 3''' of the sealing element 3 is pressed inwards (in the direction of the retainer 5) the ends of the web roll along the surfaces 6a, 8a. These rolling surfaces 6a, 8a limit the outward deformation of the two arms 3', 3" and prevent bending of the spring steel strip forming the sealing element 3 in the particularly endangered region at the juncture of the arms with the web.

The length of the rolling surfaces 6a, 8a is chosen so that the spring steel strip forming the sealing element 3 has a continuous kink-free curvature in a constant direction even in the event of the maximum deformation which it undergoes in operation (so that the rolling surfaces 6a, 8a remain tangent to the web 3''' of the sealing element 3).

Whereas in the illustrated embodiment the sealing elements are always used in pairs, a one-sided arrangement is of course also possible within the scope of the invention. Thus for instance in a vertical pipe with a gate valve built in horizontally extending bolts could take over the guiding of the gate on the other side.

What is claimed is:

1. In a pipe closure device having a valve housing member adapted for installation in such pipe, a valve member movably positioned within said housing member for movements between opened and closed positions; a sealing element interposed between said members and comprising a generally U-shaped springy strip having a pair of arms and a deformable arcuate web joining corresponding ends of said arms, and means clamping said arms to one of said members in such position that said web may engage and be deformed by the other of said members, the improvement wherein said clamping means comprises a retainer interposed between said arms adjacent their other ends; a clamping element outboard of each of said arms; and means securing said clamping elements to said retainer with the arms gripped between said retainer and the respective clamping elements, said arms converging toward one another at an acute angle in a direction away from said web, each of said clamping elements having a surface tangential to said web.

2. A device according to claim 1 wherein said angle is between about 5° and 90°.

3. A device according to claim 1 wherein said angle is between about 15° and 45°.

4. A device according to claim 1 wherein said web defines an arc greater than 180° and less than 270°.

5. A device according to claim 1 wherein said surface of each of said clamping elements extends in a direction toward said web beyond the juncture of the latter with said arms.

6. A device according to claim 1 wherein one of said clamp elements is constituted by said one of said members.

7. A device according to claim 1 wherein said retainer comprises a body having a pair of legs parelleling the respective arms, one of said legs being parallel to said one of said members and the other of said legs being inclined at said angle to said one of said legs.

8. A device according to claim 1 wherein said arms terminate short of intersection with each other.

* * * * *